United States Patent
Flesch et al.

(10) Patent No.: US 10,794,551 B2
(45) Date of Patent: Oct. 6, 2020

(54) LIGHT SYSTEM AND METHOD OF POWERING THE SAME

(71) Applicant: CLARK EQUIPMENT COMPANY, Statesville, NC (US)

(72) Inventors: Lloyd N. Flesch, North Wilkesboro, NC (US); John T Gunn, Charlotte, NC (US)

(73) Assignee: CLARK EQUIPMENT COMPANY, Statesville, NC (US)

( * ) Notice: Subject to any disclaimer, the term of this patent is extended or adjusted under 35 U.S.C. 154(b) by 260 days.

(21) Appl. No.: 15/664,243

(22) Filed: Jul. 31, 2017

(65) Prior Publication Data
US 2019/0032867 A1 Jan. 31, 2019

(51) Int. Cl.
*H02J 1/10* (2006.01)
*H02J 7/34* (2006.01)
(Continued)

(52) U.S. Cl.
CPC ............... *F21L 4/08* (2013.01); *H02J 7/007* (2013.01); *H02J 7/0021* (2013.01);
(Continued)

(58) Field of Classification Search
CPC .................... F21L 4/08; H02J 7/0021
(Continued)

(56) References Cited

U.S. PATENT DOCUMENTS 5,522,943 A 6/1996 Spencer
7,852,211 B2 12/2010 Gunn
(Continued)

FOREIGN PATENT DOCUMENTS

CA 2820968 A1 9/2013
CN 203467015 U 3/2014
(Continued)

OTHER PUBLICATIONS

Extended European Search Report dated Feb. 5, 2019 for related European Application No. 18186628.6.
(Continued)

*Primary Examiner* — Rexford N Barnie
*Assistant Examiner* — Dru Parries
(74) *Attorney, Agent, or Firm* — Michael Best & Friedrich LLP

(57) ABSTRACT

A light system includes a plurality of light towers including a first light tower and a second light tower. Each light tower include a light source, a rechargeable battery operable to provide electrical power to the light source, and a control system programmed to control the flow of power to and from the rechargeable battery. The light system further includes a power/network cord electrically connecting the first light tower to the second light tower, a power source, and a power recharge cord arranged to electrically connect the first light tower to the power source. The power recharge cord is operable to provide electrical power from the power source to the first light tower and from the first light tower to the second light tower via the power/network cord. Each control system is programmed to selectively activate the power source to initiate a recharge cycle for the respective rechargeable battery.

14 Claims, 3 Drawing Sheets

(51) Int. Cl.

| | | |
|---|---|---|
| *F21L 4/08* | (2006.01) | |
| *H02J 7/00* | (2006.01) | |
| *H02J 7/14* | (2006.01) | |
| *H05B 47/19* | (2020.01) | |
| *H05B 47/175* | (2020.01) | |
| *H05B 47/185* | (2020.01) | |
| *F21V 21/22* | (2006.01) | |
| *F21V 23/02* | (2006.01) | |

(52) U.S. Cl.
CPC .......... *H02J 7/1423* (2013.01); *H05B 47/175* (2020.01); *H05B 47/185* (2020.01); *H05B 47/19* (2020.01); *F21V 21/22* (2013.01); *F21V 23/023* (2013.01)

(58) Field of Classification Search
USPC .......................................................... 307/19
See application file for complete search history.

(56) References Cited

U.S. PATENT DOCUMENTS

| | | | |
|---|---|---|---|
| 8,577,528 | B2 | 11/2013 | Uyeki |
| 8,833,985 | B2 | 9/2014 | Robertson |
| 9,039,231 | B1 | 5/2015 | Barker |
| 2010/0232148 | A1 | 9/2010 | Sharpley |
| 2011/0249430 | A1* | 10/2011 | Stamatatos .......... B60Q 1/2615 362/184 |
| 2012/0206296 | A1 | 8/2012 | Wan |
| 2015/0028807 | A1 | 1/2015 | Mashinsky |
| 2015/0077967 | A1 | 3/2015 | Pellenc |
| 2015/0280489 | A1 | 10/2015 | Curlett |
| 2016/0223173 | A1 | 8/2016 | Chauvel et al. |
| 2017/0331322 | A1* | 11/2017 | Tuerk ..................... H02J 7/042 |
| 2017/0367153 | A1* | 12/2017 | Rooymans ......... H05B 33/0809 |

FOREIGN PATENT DOCUMENTS

| | | |
|---|---|---|
| EP | 2820920 A1 | 1/2015 |
| WO | 2014/056086 A1 | 4/2001 |
| WO | WO-2001078190 A1 | 10/2001 |
| WO | 2008/094281 A2 | 8/2008 |
| WO | 2008/094281 A3 | 8/2008 |
| WO | 2011/075062 A1 | 6/2011 |
| WO | WO-2016083590 A1 | 6/2016 |

OTHER PUBLICATIONS

Alibaba.com, "Magnetic Function LED Portable Self Charging LED Light," <http://www.alibaba.com/product-detail/Hot-UY-Q6M-1-1w-Tactical_60242615791.html?spm=a2700.7724838.2017115.1.eGr6nc> website accessed Jun. 7, 2016 (11 pages).

Amazon.com, "Terex AL5L Fuel Saving Portable LED Light Tower," <https://www.amazon.com/dp/B004QTPKOG?tag=shoppingstoresco-20> website accessed Jun. 7, 2016 (5 pages).

Eplanit.com, "Alaunus—Portable Solar Light Towers (PSLT)," <http://eplanit.com/Portals/571/Documents/AlaunusPSLT_DataSheetpdf> publicly available at least as early as Aug. 12, 2015 (4 pages).

Larsen Electronics.com, "LED Light Tower—Battery Powered—Portable Work Light," <http://www.larsonelectronics.com/p-50948-.aspx>, website accessed Jun. 7, 2016 (6 pages).

ProgressSolar.com, "New Progress Solar/HybridTM Light Towers," <http://www.progresssolarsolutions.com/Progress_Solar_Hybrid_Light_Tower_sales_sheet.pdf> publicly available at least as early as Mar. 27, 2014 (6 pages).

Thomasnet.com, "Battery Powered Light Tower Recarges From Multiple Sources," <http://news.thomasnet.com/fullstory/battery-powered-light-tower-recharges-from-multiple-sources-611399> publicly available at least as early as Mar. 19, 2012 (6 pages).

\* cited by examiner

LIGHT SYSTEM AND METHOD OF POWERING THE SAME

BACKGROUND

The present disclosure relates to a light system, and more particularly to a light system with networked rechargeable batteries and a separate power source.

SUMMARY

A light system includes a plurality of light towers having a first light tower and a second light tower. Each of the first light tower and the second light tower include a light source operable to illuminate an area adjacent the respective one of the plurality of light towers, a rechargeable battery operable to provide electrical power to the light source, and a control system programmed to control the flow of power to and from the rechargeable battery. The light system further includes a power/network cord electrically connecting the first light tower to the second light tower, a power source selectively operable to provide electrical power, and a power recharge cord arranged to electrically connect the first light tower to the power source. The power recharge cord is operable to provide electrical power from the power source to the first light tower and from the first light tower to the second light tower via the power/network cord. Each control system is programmed to selectively activate the power source to initiate a recharge cycle for the respective rechargeable battery.

A light system includes a plurality of individual and separate light towers each spaced apart from one another. Each of the plurality of light towers includes a light source operable to illuminate an area adjacent the respective light tower, a rechargeable battery operable to provide electrical power to the light source, a control system programmed to control the flow of power to and from the rechargeable battery, and an enclosure for housing the rechargeable battery, the battery charger, and the control system. The light system further includes a power source separate and remote from each of the plurality of light towers. The power source includes an electrical generator and a controller. The controller is operable to selectively operate the electrical generator to generate a supply of electrical power.

A method of powering a light source of a first light tower and a light source of a second light tower includes positioning the first light tower, positioning the second light tower relative to the first light tower, and directing power from a first rechargeable battery to the light source of the first light tower and from a second rechargeable battery to the light source of the second light tower. The method also includes electrically connecting the first light tower and the second light tower, analyzing a charge level of the first rechargeable battery and the second rechargeable battery with a control system, and powering the light source of the second light tower with the first rechargeable battery in response to the charge level of the second rechargeable battery falling below a predetermined level.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
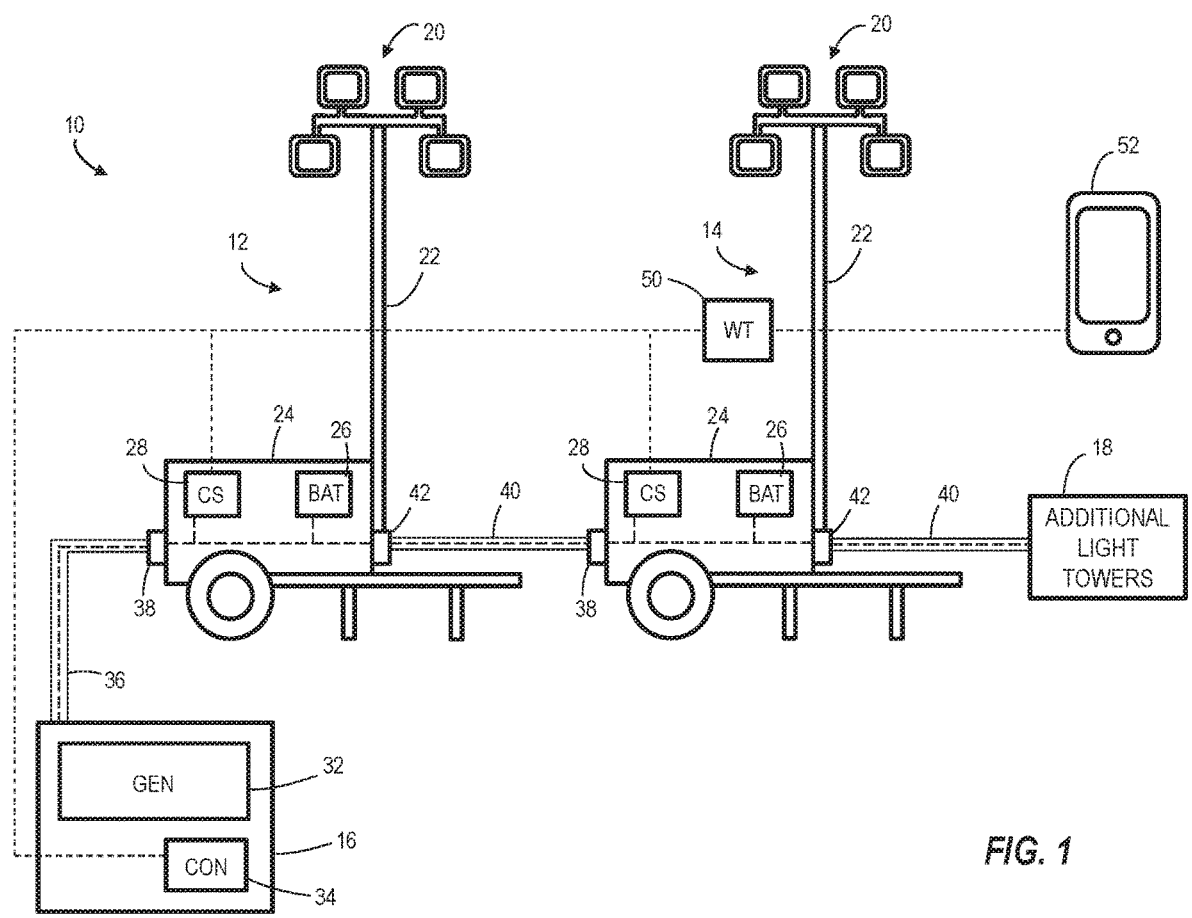
FIG. 1 is a schematic representation of a light system.

As shown in FIG. 1, a light system 10 includes a first light tower 12, a second light tower 14, and a power source 16. The light system 10 may include additional light towers (i.e., one or more additional light towers), as designated by reference numeral 18. Each light tower 12, 14, 18 includes a light source 20 supported on a first end of a vertical post 22 at a height above the ground to illuminate an area around the respective light tower 12, 14, 18. The light source 20 may be one or more light emitting diodes (LEDs), metal-halide bulbs, incandescent bulbs, halogen bulbs, or any other suitable light source. The vertical post 22 is attached at a second end (opposite the first end) to an enclosure 24 and is preferably extendable and retractable to position the light source 20 at a desired height above the enclosure 24.

The enclosure 24 is supported on and movable relative to the ground surface to allow repositioning of the light tower 12, 14, 18 and more particularly to allow repositioning of each light tower 12, 14, 18 relative to each other. The enclosure 24 houses a rechargeable battery 26 for the light source 20 and a control system 28. The rechargeable battery 26 is electrically connected to the light source 20 to selectively power the light source 20 when actuated. The rechargeable battery 26 is further electrically connected to the power source 16 to permit recharging of the rechargeable battery 26 via the power source 16. The control system 28 provides signals to the rechargeable battery 26 to control when the rechargeable battery 26 powers the light 20 and when the rechargeable battery 26 is recharged via the power source 16. The battery 26 can be manufactured using any suitable chemistry with lithium ion being preferred.

The power source 16, as shown, includes an electrical generator 32 (such as a diesel powered electrical generator) and a controller 34. The electrical generator 32 converts mechanical input into electrical output to provide electrical power to the light towers 12, 14, 18. The controller 34 sends electrical signals to the generator 32 to control when the generator 32 is actuated to provide power to the rechargeable batteries 26. The power source 16 is electrically connected to the first light tower 12 via a power recharge cord 36 that extends from the power source 16 to an electrical inlet port 38 in the first light tower 12. The power recharge cord 36 is configured to relay electrical power from the power source 16 to the first light tower 12 and may additionally relay data between the controller 34 and the control systems 28.

The power source 16 is distinct from each of the light towers 12, 14, 18 and is only connected to the light towers 12, 14, 18 via the power recharge cord 36 (attached to the first light tower 12). The separation of the power source 16 and the light towers 12, 14, 18 permits placement of the power source 16 at a location away from the light towers 12, 14, 18 such that the noise generated by the power source 16 can be minimized adjacent the light towers 12, 14, 18.

The first light tower 12 is electrically connected to the second light tower 14 via a power/network cord 40. More specifically, an electrical outlet port 42 of the first light tower 12 is electrically connected to the electrical inlet port 38 of the second light tower 14 via the power/network cord. The second light tower 14 is electrically connected to the additional light towers 18 via another power/network cord 40. Each power/network cord 40 is configured to relay electrical power and data (e.g., battery charge level) between the light towers 12, 14, 18. In preferred constructions, each of the light towers 12, 14, 18 is connected in parallel with the power source 16 to assure that the full voltage is applied to each battery 26 during recharging.

The light system 10 further includes a wireless transceiver 50. The wireless transceiver 50 is programmed to communicate with the control systems 28 of the light towers 12, 14, 18 and with the controller 34 of the power source 16. The wireless transceiver 50 further communicates with a portable electronic device 52 (e.g., a smartphone, laptop computer, tablet, etc.) and provides the portable electronic device with a signal when the charge level on one or more of the rechargeable batteries is low. Further, an operator is able to use the portable electronic device 52 as an input device to provide instruction to the control systems 28 and controller 34.

In normal operation, the power source 16 is activated to charge the rechargeable batteries 26. The power source 16 may be activated directly by operator input to a user interface of the power source 16. For example, the operator may actuate a switch, button, or other input on the power source 16, which in turn provides an input signal to the controller 34. Alternatively, the operator may provide an input to the portable electronic device 52. The portable electronic device 52 wirelessly sends a signal to the controller 34. Whether from the user interface or from the portable electronic device 52, the signal to the controller 34 prompts the controller 34 to activate the power source 16.

As an additional alternative, the power source 16 may be activated only at predetermined times. The power source 16 can be controlled to automatically activate at a specific time or at a time within a specified range. For example, in order to avoid the noise generated by the power source 16 in a business environment, the power source 16 may be automatically activated only outside of business hours. Alternatively, in a residential environment, the power source 16 may be automatically activated only outside of nighttime hours. Further still, in the environment of a sporting event, the power source 16 may be automatically activated only outside of the hours of play.

As a further alternative, the power source 16 may be activated in response to inputs provided from the control systems 28 of the light towers 12, 14, 18 to the controller 34. When the charge level of a rechargeable battery 26 drops below a predetermined threshold value (e.g., 50%, 25%, 10%, or 5% charge remaining, 60, 30, 20, 10, or 5 minutes of continuous output remaining, etc.), the respective control system 28 sends a signal to the controller 34, alerting the controller of the low battery level, and prompting the controller 34 to activate the power source 16.

Once activated, the power source 16 charges the rechargeable batteries 26 of the light towers 12, 14, 18. The controller 34 communicates with the respective control systems 28 to charge only the batteries 26 below the predetermined threshold value, or below a second threshold, greater than the first threshold. The second threshold may be, for example, fully charged. The controller 34 can control a switch or a breaker to separate particular paths to batteries as desired. Thus, not all batteries 26 need to be simultaneously charged as the switches or breakers can be arranged to isolate even a single battery 26 if desired.

In order to postpone use of the power source 16 and likewise defer the noise produced by the generator 32 when it is activated, the light towers 12, 14, 18 are programmed to selectively share power from the respective rechargeable batteries 26. As shown in the flow diagram of FIG. 2, which illustrates a scenario involving two light towers 12, 14, the power source 16 is initially activated to recharge all of the batteries 26. Electrical power from the generator 32 is provided through the electrical inlet port 38 of the first light tower 12 and to the rechargeable battery 26 of the first light tower. The rechargeable battery 26 of the second light tower 14 is charged via the generator 32, through the first light tower 12 and the power/network cord 40 physically connecting the electrical outlet port 42 of the first light tower 12 and the electrical inlet port 38 of the second light tower 14. Once the batteries 26 are recharged or the power source 16 is manually deactivated, the control systems 28 and the controller 34 communicate via electrical signals to monitor and compare the charge level of the batteries 26.

If the charge levels of both batteries 26 are measured to be above the threshold value, the control systems 28 wait a predetermined amount of time (e.g., 30 minutes, 5 minutes, 30 seconds, 5 seconds, etc.) before re-measuring the charge level of the respective batteries 26, thereby following a monitoring loop until one of the batteries drops below the threshold value.

If the charge level of the rechargeable battery 26 of the first light tower 12 drops below the threshold value, but the rechargeable battery 26 of the second light tower 14 is still above the threshold value and/or has a charge level that is greater than the first rechargeable battery by at least a predetermined amount (e.g., 1%, 3%, 5%, 10%, etc.), the second rechargeable battery 26 shares power with the first light tower 12 via the power/network cord 40 in a power sharing mode. In other words, the light source 20 of both light towers 12, 14 is powered or at least partially powered by the rechargeable battery of the second light tower 14. Alternatively, if the light source 20 of the second light tower 14 is off (i.e., not providing illumination), the battery 26 of the second light tower 14 powers only the light source 20 of the first light tower 12. Even when power sharing, the control systems 28 continue to monitor the charge level of the batteries 26. Once both batteries 26 are below the threshold value, the control systems 28 instruct the controller 34 to activate the power source 16 to recharge both batteries 26 in a recharge mode.

If the charge level of the rechargeable battery 26 of the second light tower 14 drops below the threshold value, but the rechargeable battery 26 of the first light tower 12 is still above the threshold value and/or has a charge level that is greater than the second rechargeable battery 26 by at least a predetermined amount (e.g., 1%, 3%, 5%, 10%, etc.), the first rechargeable battery 26 shares power with the second light tower 14 via the power/network cord 40. In other words, the light source 20 of both light towers 12, 14 is powered by the rechargeable battery of the first light tower 12 in a power sharing mode. Alternatively, if the light source 20 of the first light tower 12 is off (i.e., not providing illumination), the battery 26 of the first light tower 12 powers only the light source 20 of the first light tower 12. Once both batteries 26 are below the threshold value, the control systems 28 instruct the controller 34 to actuate the power source 16 to recharge both batteries 26 in a recharge mode.

Figure 2:
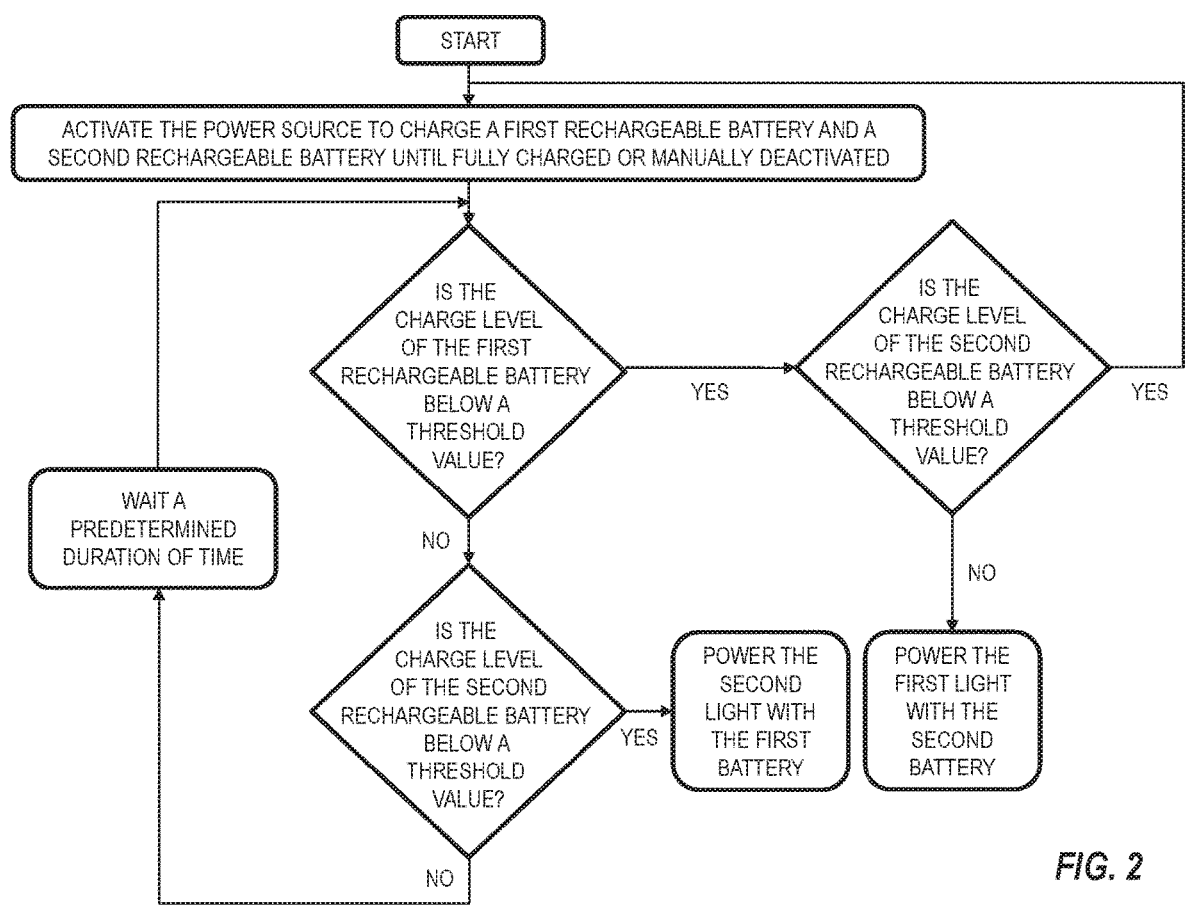
FIG. 2 is a flow diagram illustrating a method of powering the light system.
Figure 3:
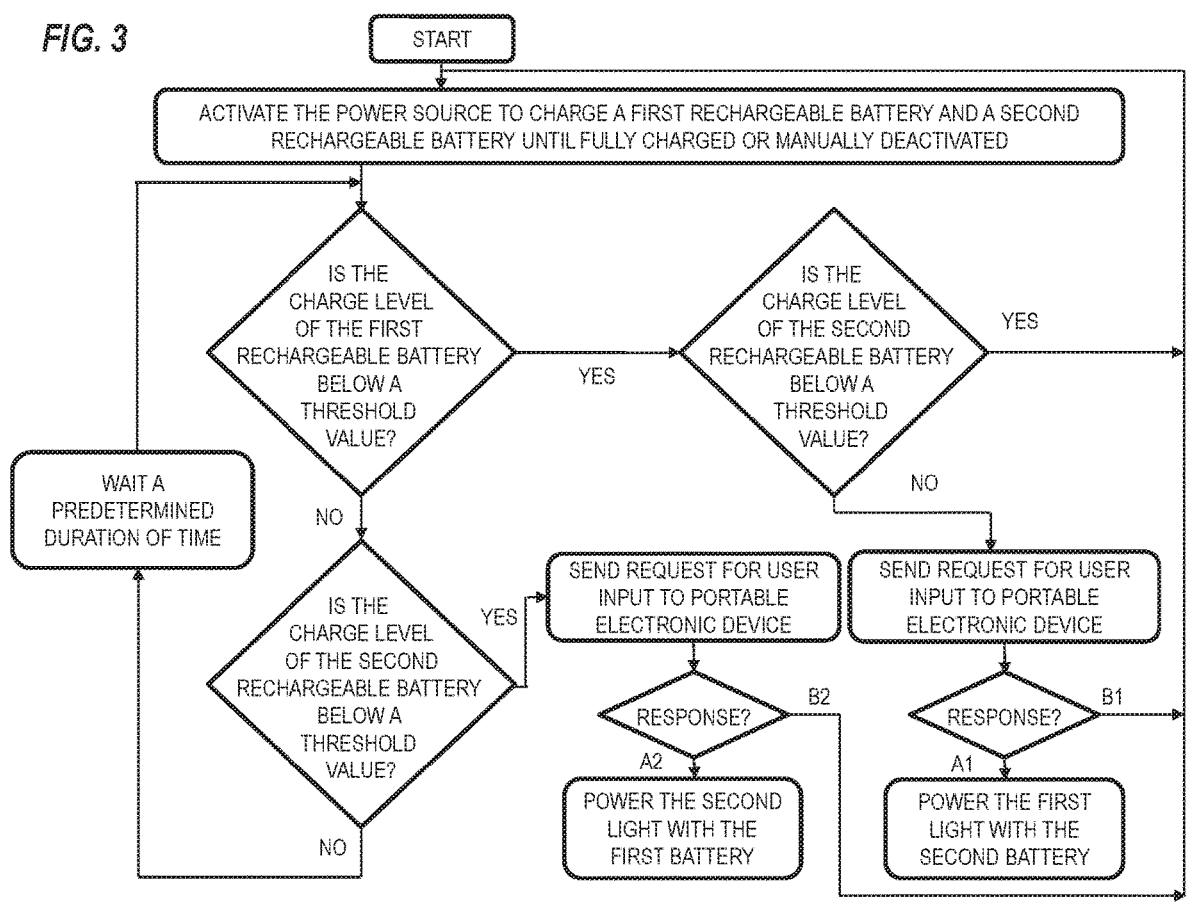
FIG. 3 is a flow diagram illustrating a further method of powering the lights system.

FIG. 2 illustrates a process that may be performed free of user input. Alternatively, it may be desirable to have operator input to review battery charge levels and verify process changes before they occur. FIG. 3 illustrates a process similar to FIG. 2, with additional steps of verification.

As shown in the flow diagram of FIG. 3, which illustrates a scenario involving two light towers 12, 14, the power source 16 is initially actuated to recharge all of the batteries 26. Electrical power from the generator 32 is provided through the electrical inlet port 38 of the first light tower 12 and to the rechargeable battery 26 of the first light tower. The rechargeable battery 26 of the second light tower 14 is charged via the generator 32, through the first light tower 12 and the power/network cord 40 physically connecting the electrical outlet port 42 of the first light tower 12 and the electrical inlet port 38 of the second light tower 14. Once the batteries 26 are recharged or the power source 16 is manually deactivated, the control systems 28 and the controller 34 monitor the charge level of the batteries 26.

If the charge levels of both batteries 26 are measured to be above the threshold value, the control systems 28 wait the predetermined amount of time before re-measuring the charge level of the respective batteries 26, thereby following the monitoring loop discussed above with respect to FIG. 2.

If the charge level of the rechargeable battery 26 of the first light tower 12 drops below the threshold value, but the rechargeable battery 26 of the second light tower 14 is still above the threshold value and/or has a charge level that is greater than the first rechargeable battery by at least a predetermined amount, the control system 28 sends a signal to the wireless transceiver 50. In response to the signal, the wireless transceiver 50 sends an alert to the portable electronic device 52. The operator is able to review the charge level of both batteries 26 and decide, via the portable electronic device 52, whether the second rechargeable battery 26 should share power with the first light tower 12. Alternatively, the operator may decide to turn off the first light tower 12, actuate the power source 16 to recharge the batteries 26, or may decide to allow the first rechargeable battery 26 to continue powering the first light tower 12. For example, if the operator notes that the charge level of the second rechargeable battery 26 is nearing the threshold value (and power sharing would only last a short duration), the operator may bypass the power sharing mode (as designated by direction A1), and instead recharge the batteries 26 with the power source 16 (as designated by direction B1).

If the charge level of the rechargeable battery 26 of the second light tower 14 drops below the threshold value, but the rechargeable battery 26 of the first light tower 12 is still above the threshold value and/or has a charge level that is greater than the second rechargeable battery 26 by at least a predetermined amount the control system 28 sends a signal to the wireless transceiver 50. In response to the signal, the wireless transceiver sends an alert to the portable electronic device 52. The operator is able to review the charge level of both batteries 26 and decide, via the portable electronic device 52, whether the first rechargeable battery 26 should share power with the second light tower 14. Alternatively, the operator may decide to turn off the second light tower 14, actuate the power source 16 to recharge the batteries 26, or may decide to allow the second rechargeable battery 26 to continue powering the second light tower 14. For example, if the operator notes that the charge level of the first rechargeable battery 26 is nearing the threshold value, the operator may bypass the power sharing mode (as designated by direction A2), and instead recharge the batteries 26 with the power source 16 (as designated by direction B2).

Regardless of the decision made by the operator, once both batteries 26 are below the threshold value, the control systems 28 instruct the controller 34 to actuate the power source 16 to recharge both batteries 26. Alternatively, the operator may receive a prompt to activate the power source 16 via the portable electronic device 52, or a prompt on the portable electronic device 52 to manually activate the power source 16.

While FIGS. 2-3 are directed towards a light system including two light towers 12, 14, the concept of power sharing can be applied to the additional light towers 18 as well. For example, in a scenario with three light towers 12, 14, 18, each of the batteries 26 is monitored and three modes of power sharing exist. In a first mode, each battery 26 powers its respective light source 20. In a second mode, one of the batteries 26 provides power to two light sources and another battery 26 provides power to the third light source 20. In a third mode, one of the batteries 26 provides power to all of the light sources 20.

Various features of the disclosure are set forth in the following claims.

What is claimed is:

1. A light system comprising:
a plurality of light towers including a first light tower and a second light tower, each of the first light tower and the second light tower comprising:
a light source operable to illuminate an area adjacent the respective one of the plurality of light towers;
a rechargeable battery operable to provide electrical power to the light source;
a control system programmed to control the flow of power to and from the rechargeable battery;
a power/network cord electrically connecting the first light tower to the second light tower;
a power source selectively operable to provide electrical power; and
a power recharge cord arranged to electrically connect the first light tower to the power source, the power recharge cord operable to provide electrical power from the power source to the first light tower and from the first light tower to the second light tower via the power/network cord,
wherein each control system is programmed to selectively activate the power source to initiate a recharge cycle for the respective rechargeable battery.

2. The light system of claim 1, wherein the first light tower includes an electrical inlet port that receives the power recharge cord and an electrical outlet port that receives a first end of the power/network cord, and wherein the second light tower includes an electrical inlet port that receives a second end of the power/network cord.

3. The light system of claim 2, wherein the rechargeable battery of the first light tower is configured to selectively provide electrical power to the first light tower and the second light tower, and wherein the rechargeable battery of the second light tower is configured to selectively provide electrical power to the first light tower and the second light tower.

4. The light system of claim 3, wherein the control system of the first light tower and the control system of the second light tower are programmed to control the flow of power between the rechargeable battery of the first light tower and the rechargeable battery of the second light tower.

5. The light system of claim 1, wherein the power source is an electrical generator.

6. The light system of claim 1, wherein the control system of the first light tower is programmed to communicate with the control system of the second light tower to analyze a charge level of the respective rechargeable battery.

7. The light system of claim 1, further comprising a wireless transceiver communicable with a portable electronic device, wherein the wireless transceiver is operable to provide a signal to the portable electronic device when a charge level of the light system is below a predetermined value.

8. The light system of claim 1, wherein each of the first light tower and second light tower further comprises an enclosure for housing the rechargeable battery and control system, and wherein the power source is external of the enclosures.

9. A light system comprising:
  a plurality of individual and separate light towers each spaced apart from one another, each of the plurality of light towers including:
  a light source operable to illuminate an area adjacent the respective light tower;
  a rechargeable battery operable to provide electrical power to the light source;
  a control system programmed to control the flow of power to and from the rechargeable battery; and
  an enclosure for housing the rechargeable battery and the control system; and
  a power source electrically connected to each of the plurality of light towers and positioned separate and remote from each of the plurality of light towers, the power source including an electrical generator and a controller, the controller operable to selectively operate the electrical generator to generate a supply of electrical power for delivery to at least one of the plurality of light towers to charge the rechargeable battery,
  wherein the plurality of light towers communicate with the power source to initiate a recharge mode, and wherein each control system communicates with the other control systems to initiate a power sharing mode, and
  wherein, in the recharge mode, the power source is in an activated state to provide electrical power to at least one of the plurality of light towers, and wherein, in the power sharing mode, the power source is in a deactivated state and each rechargeable battery is selectively recharged via another rechargeable battery.

10. The light system of claim 9, wherein each control system is configured to provide a signal indicative of a charge level of the respective rechargeable battery, and wherein the controller is programmed to actuate the electrical generator in response to the signal.

11. The light system of claim 9, wherein the plurality of light towers include a first light tower and a second light tower, and wherein the power source is connected to the first light tower and the first light tower is connected to the second light tower such that the power source is connected to the second light tower via the first light tower.

12. The light system of claim 9, wherein the control system analyzes a charge level of the rechargeable battery of one of the plurality of light towers and relays a signal indicative of the charge level to another of the plurality of light towers.

13. The light system of claim 12, wherein one of the light towers of the plurality of light towers shares electrical power from the rechargeable battery associated with the one of the plurality of light towers with the rechargeable battery associated with another of the plurality of light towers in response to the signal.

14. The light system of claim 9, further comprising a wireless transceiver communicable with a portable electronic device, wherein the wireless transceiver is operable to provide a signal to the portable electronic device when a charge level of the light system is below a predetermined level.

* * * * *